United States Patent [19]

Fender et al.

[11] 4,128,340
[45] Dec. 5, 1978

[54] PORTABLE TEST APPARATUS FOR LOW LIGHT LEVEL DEVICES

[75] Inventors: Ferdinand G. Fender, Glenview; Jon E. Tegethoff, Schaumburg, both of Ill.

[73] Assignee: Ni-Tec, Inc., Skokie, Ill.

[21] Appl. No.: 708,014

[22] Filed: Jul. 23, 1976

[51] Int. Cl.² .................... G01J 1/42; G01D 18/00
[52] U.S. Cl. .................................. 356/218; 250/252; 356/222
[58] Field of Search .................. 356/218, 222; 250/252

[56] References Cited

U.S. PATENT DOCUMENTS

| | | | |
|---|---|---|---|
| 2,913,669 | 11/1959 | Herbert, Jr. | 250/252 |
| 3,030,509 | 4/1962 | Carlson | 250/363 |
| 3,056,885 | 10/1962 | Scherbatskoy | 250/363 |
| 3,225,195 | 12/1965 | Scherbatskoy | 250/363 |
| 3,743,430 | 7/1973 | Riggs | 356/222 |

Primary Examiner—John K. Corbin
Assistant Examiner—Stewart Levy
Attorney, Agent, or Firm—Cook, Wetzel & Egan, Ltd.

[57] ABSTRACT

The disclosure relates to an apparatus for measuring the light intensity gain performance of an image intensifier. The apparatus includes a light source which illuminates the input surface of the intensifier with input light of predetermined and constant intensity, a light sensitive detector arranged at the intensifier output for receiving at least a portion of the output light produced by the intensifier in response to the input light and for providing an electrical signal having an amplitude directly related to the intensity of the output light and an indicator coupled to the detector for providing an indication of the intensifier light intensity gain performance responsive to the electrical signal provided by the detector. Also disclosed is a modification wherein a second light sensitive detector is positioned relative to the light source for receiving a portion of the input light and for providing a reference signal responsive thereto and a difference amplifier which determines the difference between the amplitudes of the electrical signal provided by the detector at the intensifier output and the reference signal provided by the detector at the intensifier input. The difference signal thereby produced is coupled to an indicator which provides an indication of the intensity gain performance of the intensifier which is directly related to the amplitude of the difference signal.

6 Claims, 2 Drawing Figures

4,128,340

PORTABLE TEST APPARATUS FOR LOW LIGHT LEVEL DEVICES

BACKGROUND OF THE INVENTION

The present invention is directed to testing apparatus for image intensifiers and in particular to an apparatus for measuring the light intensity gain performance of an image intensifier.

Low light level viewing systems of the type which include image intensifiers are becoming more and more popular. Under continued use, many intensifiers of low light level viewing systems suffer a gradual loss of luminous gain. Unfortunately, the user may not be able to tell when performance is marginal. As a result, the usual procedure is to use a system until excessive gain decay is suffered and then to return it to the manufacturer for repair. This situation occurs because most users of such low light level viewing systems are not equipped to make the required intensity gain performance measurements.

Manufacturers of low light level viewing systems are well equipped to make such gain performance measurements. However, the only equipment presently available to such manufacturers for making these measurements are general-purpose photometers and special low intensity light sources all of which are not portable and thus not suitable for use where low light level systems are generally employed. Additionally, all of these instruments have far more flexibility than is actually required for gain performance measurements and are therefore far more expensive than necessary.

It is therefore an object of the present invention to provide a portable apparatus for measuring the gain performance of an image intensifier in a low light level viewing system.

It is another object of the present invention to provide an apparatus for measuring the gain performance of image intensifiers which is both accurate and inexpensive.

SUMMARY OF THE INVENTION

The invention provides an apparatus for measuring the light intensity gain (luminous gain) performance of an image intensifier of the type having an input surface for receiving input visible light and an output for providing output visible light which is an intensified image of the input visible light. The apparatus comprises a light source for illuminating the intensifier input surface with input light of predetermined and constant intensity, a light sensitive detector arranged relative to the intensifier output for receiving at least a portion of the output light produced by the intensifier in response to said input light and for providing an electrical signal having an amplitude directly related to the intensity of said output light and an indicator coupled to the detector for providing an indication of the intensifier light intensity gain performance responsive to the electrical signal provided by the detector.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, and in the several figures of which like reference numerals indicate identical elements and in which:

DESCRIPTION OF THE PREFERRED EMBODIMENT

Figure 1:
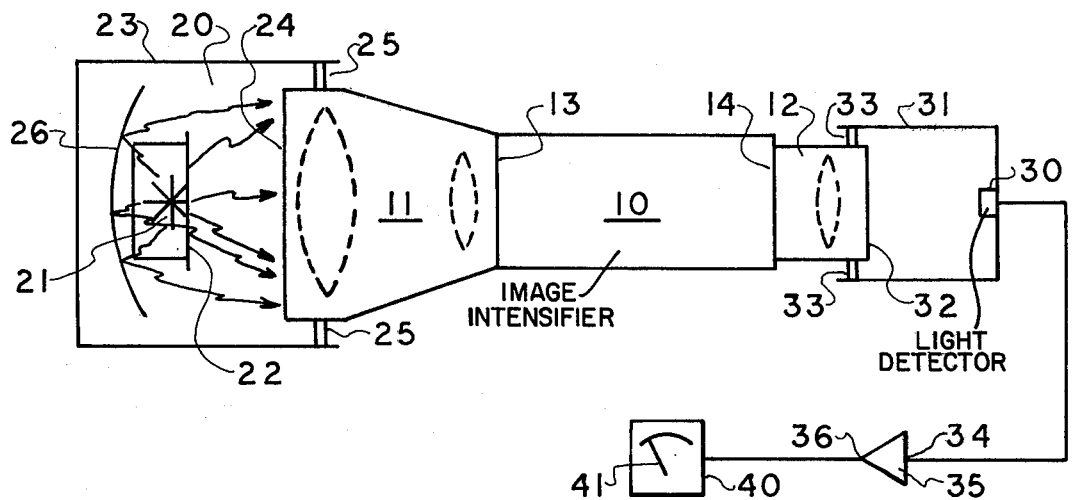
FIG. 1 is a schematic representation of an intensity gain measuring apparatus of the type embodying the present invention.

FIG. 1 shows an apparatus embodying the present invention in conjunction with an image intensifier of a low light level viewing system which is under test. The low light level viewing system may be of the type well known in the art which includes the image intensifier 10, an objective lens 11, and an eye piece or viewer 12. As well known, the image intensifier 10 is sensitive to visible light and includes an input surface 13 for receiving input light and an outut surface 14 for providing output light which is an intensified image of the input light. The objective lens 11 places the input light or optical image on the light-sensitive intensifier input surface. The eyepiece or viewer is provided to facilitate observing the output light of the intensifier 10.

The test apparatus embodying the present invention shown in FIG. 1 comprises a light source 20, a light sensitive detector 30, an amplifier 35, and an indicator or meter 40.

Light source 20 includes a source of radio-active material 21 such as tritium or krypton-85. Such radioactive material as tritium or krypton-85 provide radiation of constant intensity. Light source 20 also includes phosphor 22 shown schematically as incapsulating the radio-active material but could as well be combined with or otherwise packaged with the radio-active material. The phosphor converts the constant radiation of the radio-active material to light of constant intensity. The light source thus provided is stable and has a predictable very long term decay characteristic.

Light source 20 also includes a light-tight enclosure 23 which has an opening 24 dimensioned to receive the input of the system under test. As shown in FIG. 1, the opening 24 is dimensioned to receive the objective lens 11 of the low light level viewing system but could as well be adapted for receiving the input of intensifier 10 directly upon the removal of the objective lens from the intensifier. A seal 25, such as an 0-ring, is provided about opening 24 to seal the gap between opening 24 and the input of the system to ambient light. This assures that the input light received at the input surface of the image intensifier is derived only from the light source.

Light source 20 further includes a mirror 26 which reflects the light from the light source in an even pattern towards opening 24 and into the system under test. The mirror is configured to evenly distribute the input light so that the input surface 13 of the intensifier 10 receives input light of constant intensity over substantially all of the intensifier input. As a possible alternative to mirror 26, a lens or diffusing plate or combinations thereof may be utilized.

The detector 30 consists of a photodetector such as a cadmium sulphide or silicon photocell. It provides an electrical signal which is proportional in amplitude to the intensity received by the detector. The detector 30 is housed in a light-tight enclosure 31 which has an opening 32 dimensioned for receiving the eye piece 12. As an alternative, the enclosure 31 and opening 32 could be dimensioned for receiving the output 14 of the image intensifier 10 directly with the eye piece 12 removed.

About opening 32 is a seal 33 which may comprise a rubber O-ring which seals the gap between the enclosure 31 and the eye piece 12. This precludes ambient light from entering the light-tight enclosure and impinging upon detector 30 to assure that the light received by detector 30 is only derived from the output of the intensifier.

Detector 30 is coupled to an input 34 of amplifier 35. Amplifier 35 amplifies the electrical signal and provides at output 36 an amplified electrical signal which is proportional to the electrical signal provided by detector 30. Output 36 is coupled to meter 40.

Meter 40 may be of the type known as a D'Arsonval. It is an analog indicator and provides a deflection on needle 41 which is directly related to the amplitude of the electrical signal provided by detector 30. Because the light intensity of light source 20 is predetermined and known, and remains constant for the entire test, and because the output voltage provided by detector 30 for a given light intensity may be determined, meter 40 will provide a direct indication of the intensity gain performance of the image intensifier 10.

Figure 2:
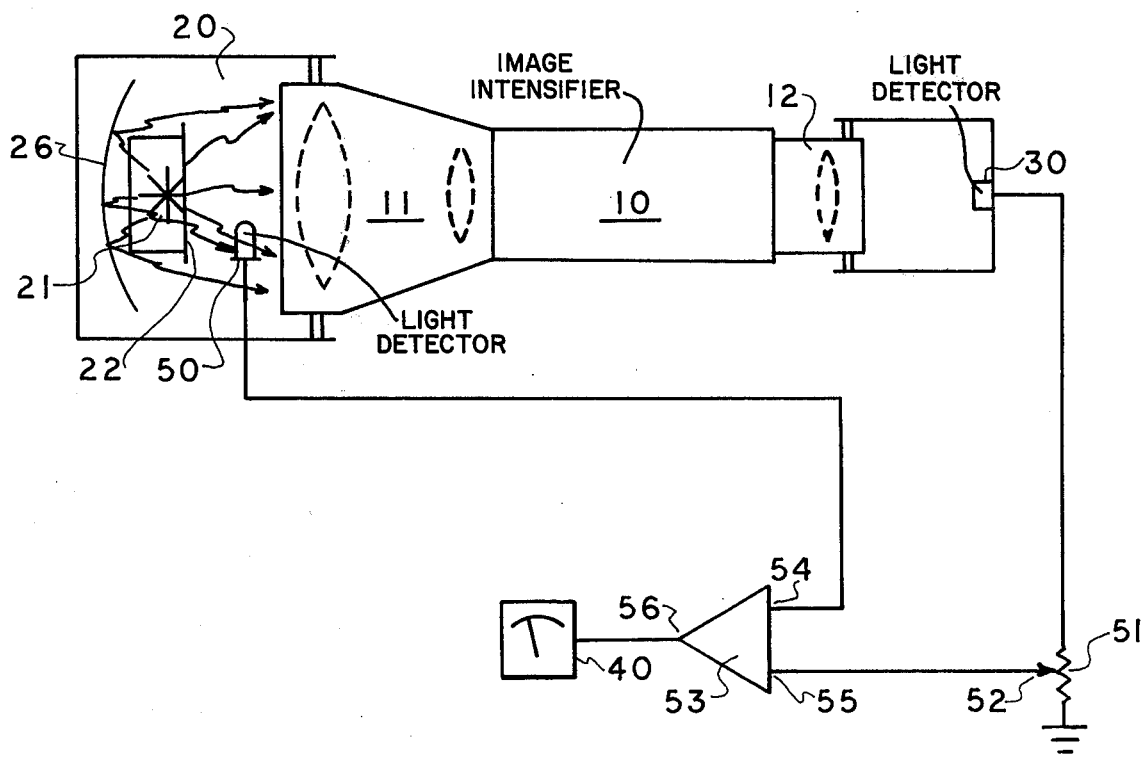
FIG. 2 is a schematic representation of an apparatus embodying additional features of the present invention.

FIG. 2 shows an embodiment of the present invention which provides improved accuracy in obtaining the gain performance measurement when such improved accuracy is necessary. Reference numerals have been maintained in FIG. 2 where there is identical correlation with FIG. 1 for simplicity. In addition to what is shown in FIG. 1, the embodiment of FIG. 2 includes a second light sensitive detector 50, variable resistor 51, and a differential amplifier 53.

The second detector 50 is positioned relative to the light source 20 such that it receives the input light directly. The detector therefore provides a reference electrical signal having an amplitude directly related to the intensity of the light source and of constant amplitude inasmuch as the light intensity of the light source is constant. The second or reference detector 50 is coupled to input 54 of differential amplifier 53.

Detector 30 is coupled to the variable resistor 51 wherein a portion of the electrical signal provided by detector 30 is tapped at wiper 52. Wiper 52 is coupled to input 55 of differential amplifier 53.

Output 56 of differential amplifier 53 provides a difference signal which is proportional to the difference between the amplitudes of the reference electrical signal and the tapped portion of the electrical signal provided by detector 30. The gain of amplifier 53 determines the scale factor of meter 40.

The difference signal provided by difference amplifier 53 is utilized by the meter 40 for indicating the intensity gain performance of the intensifier 10. The embodiment of FIG. 2 is appropriate if higher precision is required over that of an inexpensive photocell or for measurements over a wide temperature range. A further variation might include a digital meter in place of analog meter 40 or for any other device to measure the output amplitudes of amplifiers 35 or 53. If only a "go-no-go" indication is required, light emitting diodes and level detectors may be substituted for the meter 40.

Thus, it can be seen that the present invention provides an apparatus for measuring the light intensity gain performance of an image intensifier which is both inexpensive and portable in use. The apparatus of the present invention is fully portable in that the light source needs no external power and the detector, amplifier, and meter may be easily battery powered. Also, the enclosures for the light source and the detector need only be slightly wider than the width of the low light level viewing system which is itself portable.

Required accuracy is also obtainable with the apparatus of the present invention inasmuch as the light output of the light source is constant and predetermined, and inasmuch as the light intensity versus electrical amplitude output of the detectors may be measured or easily obtained. Thus, a direct reading of the image intensifier gain is possible. If still further accuracy is required than the apparatus of FIG. 1 is capable of affording, the apparatus of FIG. 2 may be utilized to provide the additional required accuracy. It is particularly accurate inasmuch as it has a second matched light sensitive detector which provides a reference output and a differencial amplifier which provides a difference signal for meter 40.

While a particular embodiment of the invention has been shown and described, modifications may be made, and it is intended in the appended claims to cover all such modifications as may fall within the true spirit and scope of the invention.

We claim:

1. An apparatus for measuring the light intensity gain performance of an image intensifier of the type having an input surface for receiving input visible light and an output for providing output visible light which is an intensified image of said input visible light, said apparatus comprising:

a light source for illuminating the intensifier input surface with input light of predetermined and constant intensity, and light source comprising a light-tight enclosure having an opening dimensioned to receive said intensifier input and a seal about said opening to seal the gap between said opening and the intensifier input to ambient light to thereby assure that said input light is derived only from said light source, means for distributing the input light from said light source over substantially all of the input surface of the intensifier;

a light sensitive detector arranged relative to the intensifier output for receiving a predetermined portion of the output light produced by the intensifier in response to said input light and for providing an electrical signal having an amplitude directly related to the intensity of said output light; and an indicator coupled to said detector for providing an indication of the intensifier light intensity gain performance responsive to said electrical signal provided by said detector.

2. An apparatus in accordance with claim 1 wherein said light source further comprises a radio-active material for providing constant radiation and phosphor associated with said radio-active material for converting said constant radiation to light of constant intensity.

3. An apparatus in accordance with claim 2 wherein said radio-active material is tritium.

4. An apparatus in accordance with claim 2 wherein said radio-active material is krypton.

5. An apparatus for measuring the light intensity gain performance of an image intensifier of the type having an input surface for receiving input visible light and an output for providing output visible light which is an intensified image of said input visible light, said apparatus comprising:

a light source for illuminating the intensifier input surface with input light of predetermined and constant intensity;

means for distributing the input light from said light source over substantially all of the input surface of the intensifier, said distributing means comprising a mirror for reflecting the light provided by said light source toward the intensifier input in an even pattern to thereby provide input light of constant intensity over substantially all of the intensifier input surface;

a light sensitive detector arranged relative to the intensifier output for receiving a predetermined portion of the output light produced by the intensifier in response to said input light and for providing an electrical signal having an amplitude directly related to the intensity of said output light; and an indicator coupled to said detector for providing an indication of the intensifier light intensity gain performance responsive to said electrical signal provided by said detector.

6. An apparatus for measuring the light intensity gain performance of an image intensifier of the type having an input surface for receiving input visible light and an output for providing output visible light which is an intensified image of said input visible light, said apparatus comprising:

a light source for illuminating the intensifier input surface with input light of predetermined and constant intensity;

means for distributing the input light from said light source over substantially all of the input surface of the intensifier;

a light sensitive detector arranged relative to the intensifier output for receiving a predetermined portion of the output light produced by the intensifier in response to said input light and for providing an electrical signal having an amplitude directly related to the intensity of said output light, said detector comprising a light-tight enclosure having an opening dimensioned to receive the intensifier output and a seal about said opening to seal the gap between said opening and the intensifier output to ambient light to thereby assure that the output light received by said detector is derived only from said intensifier; and an indicator coupled to said detector for providing an indication of the intensifier light intensity gain performance responsive to said electrical signal provided by said detector.

* * * * *